(12) United States Patent
Dadheech et al.

(10) Patent No.: US 9,136,545 B2
(45) Date of Patent: Sep. 15, 2015

(54) LOW COST FUEL CELL BIPOLAR PLATE AND PROCESS OF MAKING THE SAME

(75) Inventors: Gayatri Vyas Dadheech, Rochester Hills, MI (US); Thomas A. Trabold, Pittsford, NY (US); Mahmoud H. Abd Elhamid, Grosse Pointe Woods, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 424 days.

(21) Appl. No.: 12/038,007

(22) Filed: Feb. 27, 2008

(65) Prior Publication Data

US 2009/0214927 A1   Aug. 27, 2009

(51) Int. Cl.
| | |
|---|---|
| H01M 8/04 | (2006.01) |
| C25D 3/56 | (2006.01) |
| H01M 8/00 | (2006.01) |
| B05D 5/12 | (2006.01) |
| C25D 3/00 | (2006.01) |
| H01M 8/02 | (2006.01) |

(52) U.S. Cl.
CPC .......... *H01M 8/0228* (2013.01); *H01M 8/0206* (2013.01); *Y02E 60/50* (2013.01)

(58) Field of Classification Search
CPC ... H01M 8/0206; H01M 8/0228; Y02E 60/50
USPC ............................................... 429/12, 34–39
See application file for complete search history.

(56) References Cited

U.S. PATENT DOCUMENTS

| | | | |
|---|---|---|---|
| 3,134,689 A | 5/1964 | Pritikin et al. | |
| 4,272,353 A | 6/1981 | Lawrance et al. | |
| 4,389,973 A | 6/1983 | Suntola et al. | |
| 5,624,769 A | 4/1997 | Li et al. | |
| 5,980,977 A * | 11/1999 | Deng et al. | 427/79 |
| 6,287,965 B1 * | 9/2001 | Kang et al. | 438/648 |
| 6,291,093 B1 * | 9/2001 | Kindler et al. | 429/34 |
| 6,893,765 B1 * | 5/2005 | Nishida et al. | 429/481 |
| 7,550,222 B2 * | 6/2009 | Vyas et al. | 429/34 |
| 2003/0096151 A1 | 5/2003 | Blunk et al. | |
| 2003/0165615 A1 * | 9/2003 | Aaltonen et al. | 427/79 |
| 2004/0106029 A1 * | 6/2004 | Iqbal et al. | 429/27 |

(Continued)

FOREIGN PATENT DOCUMENTS

| | | |
|---|---|---|
| CN | 101057350 A | 10/2007 |
| JP | 2007257883 | 10/2007 |
| WO | 2006014403 | 2/2006 |

OTHER PUBLICATIONS

U.S. Appl. No. 11/536,061, filed Sep. 28, 2006—First Named Inventor: G. Dadheech et al.

(Continued)

*Primary Examiner* — Carlos Barcena
(74) *Attorney, Agent, or Firm* — BrooksGroup

(57) ABSTRACT

Fuel cell bipolar plates are made by depositing a pinhole free corrosion resistant and/or a conductive layer on a metal plate using an atomic layer deposition method. In one embodiment, a conductive layer is deposited on an anodized metal plate using atomic layer deposition method. In another embodiment, at least one corrosion resistant metal oxide layer and at least one conductive layer are deposited on a metal plate individually using atomic layer deposition method. In yet another embodiment, a corrosion resistant and conductive metal oxynitride layer is deposited on a metal plate using an atomic layer deposition method.

23 Claims, 4 Drawing Sheets

(56) References Cited

U.S. PATENT DOCUMENTS

| | | | |
|---|---|---|---|
| 2004/0157108 A1* | 8/2004 | Blunk et al. | 429/42 |
| 2006/0019033 A1* | 1/2006 | Muthukrishnan et al. | 427/248.1 |
| 2006/0105222 A1* | 5/2006 | Abd Elhamid et al. | 429/38 |
| 2006/0216571 A1* | 9/2006 | Vyas et al. | 429/38 |
| 2007/0243452 A1* | 10/2007 | Weidman et al. | 429/44 |

OTHER PUBLICATIONS

A. Jouaiti et al., Corrosion Behaviour of TiN0.8O0.4 Coating on 316L Stainless Steel Alloy, XP 009075624, Journal of Chemical Research (S), 2003, pp. 786-788.

Hong Xiao, Introduction to Semiconductor Manufacturing Technology, Austin Community College, pp. 496-497 (4 pages in total).

Supramaniam Sriniv Asan et al, Recent Advances in Solid Polymer Electrolyte Fuel Cell Technology with Low Platinum Loading Electrodes, Journal of Power Sources, vol. 29, (1990), pp. 367-387.

German Office Action dated Dec. 3, 2011, Application Serial No. 10 2009 010 279.5, Applicant: GM Global Technology Operations LLC, 8 pages.

Chinese Office Action dated Feb. 10, 2015 ; Application No. 200910117968.1 ; Applicant: GM Global Technology Operations, Inc.; 6 pages.

* cited by examiner

LOW COST FUEL CELL BIPOLAR PLATE AND PROCESS OF MAKING THE SAME

TECHNICAL FIELD

The field to which the disclosure generally relates includes fuel cell bipolar plates and process of making the same.

BACKGROUND

A fuel cell usually consists of a series of membrane electrode assemblies and bipolar plates stacked together in an alternating manner. The membrane electrode assembly is typically made of an ion conductive membrane sandwiched between an anode and a cathode each on the opposite side of the membrane. Bipolar plate is a plate like electric conductor having plurality of channels for fluid passage. At least two different reactive gases flow through the bipolar plate channels to reach the respective anode and cathode sections where electrochemical reactions of the gases take place to generate electricity. The electricity generated from the electrochemical reactions is collected and conducted through the bipolar plate to an external circuit. The bipolar plate, therefore, needs to have high electric conductivity or low electric contact resistance to minimize energy loss. The bipolar plate also needs to meet very stringent corrosion resistance requirement due to the harsh environment created by the reactive gases, electrochemical reactions and contaminants generated from the membrane electrolyte.

In the case of a hydrogen fuel cell, water management is another key challenge. Water is continuously generated in a hydrogen fuel cell. In addition, the fuel cell membrane needs to maintain a certain level of hydration for necessary proton conductivity. When a hydrogen fuel cell is operated at a low current density, for example, at $0.2 A/cm^2$, there is usually not enough gas flow to remove the water generated at the cathode section. As a result, water tends to condense in the fluid passages as droplets near the cathode and block the flow of the reactive gas. Without the supply of reactive gas, the blocked section of the fuel cell will not produce electricity. Performance of the fuel cell will deteriorate due to non-homogeneous current distribution. Such phenomenon is known as low power stability (LPS). Conventional noble metal conductive coatings, such as gold and platinum coatings, have water contact angles greater than 40 degree, a condition conducive to formation of stable water droplets. Such high water contact angles thus do not provide desirable water management.

Low cost, light weight and easy manufacturing process are also important consideration for a commercially viable and desirable bipolar plate. Metal plates are attractive bipolar plate materials due to their high electric conductivity and low cost. Metals such as stainless steel and aluminum can be easily made into very thin sheet. Fluid flow channels can be created on a metal sheet by a simple inexpensive stamping process. Most of the low cost metal sheets, however, do not have the corrosion resistance required in a fuel cell, mainly because of the corrosive fluoride ions released from the fuel cell membrane. Metal corrosion not only degrades the bipolar plate itself, but also produces soluble metal ions that contaminates the fuel cell membrane and impairs its proton conductivity. There is thus a need to provide a low cost metal bipolar plate with improved corrosion resistance and water management properties.

SUMMARY OF EXEMPLARY EMBODIMENTS OF THE INVENTION

One embodiment of the invention includes a process of producing fuel cell bipolar plates comprises providing a conductive metal plate having at least one channel configured for fluid passage; anodizing the conductive metal plate to form a corrosion resistant surface layer having a water contact angle less than 40 degree; and depositing at least one conductive layer above the corrosion resistant surface layer using atomic layer deposition method. The conductive layer comprises at least one material selected from the group consisting of metal oxides, metal nitrides, metal oxynitrides, noble metals, and carbon.

Another embodiment of the invention includes a process of producing fuel cell bipolar plates comprises providing a conductive metal plate; depositing on the metal plate an uniform and pinhole free corrosion resistance layer comprising at least one metal oxide using atomic layer deposition method; and depositing at least one conductive layer above the corrosion resistant layer using atomic layer deposition method. The conductive layer may include at least one of metal oxides, metal nitrides, metal oxynitrides, noble metals, or carbon.

Yet another embodiment of the invention includes a process of producing a fuel cell bipolar plate comprises (a) providing a conductive metal plate; (b) providing a metal compound, an oxygen compound, and a nitrogen compound; (c) placing the conductive metal plate inside an atomic layer deposition chamber; (d) exposing said metal plate to a gas pulse comprising the metal compound vapor such that at least one atomic layer of the metal compound is adsorbed on the surface of the metal plate; (e) purging the deposition chamber with an inert gas to remove the metal compound vapor and; (f) after the metal compound being adsorbed on the metal plate, exposing the metal plate to at least one gas pulse comprising the oxygen and the nitrogen compound at a temperature between 100 and 600° C., causing the adsorbed metal compound to react with the oxygen compound and the nitrogen compound to form a metal oxynitride. Optionally, repeating (d) through (f) until a desired thickness of oxynitride layer is obtained.

A fuel cell bipolar plate produced according to any one of the above embodiments exhibits excellent corrosion resistance, low electric contact resistance and good water management properties.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

The following description of the embodiment(s) is merely exemplary in nature and is in no way intended to limit the invention, its application, or uses.

One embodiment of the invention includes the fuel cell bipolar plate including an electrically conductive metal or metal alloy plate having at least one corrosion resistant layer and/or one conductive layer deposited by an atomic layer deposition method. Any inexpensive and chemically stable metal materials can be used as the metal plate. Suitable metal materials include, but not limited to, aluminum, aluminum alloys, steel, stainless steel, titanium and titanium alloys. Aluminum and aluminum alloy may be used to achieve high energy density due to their low specific gravity and low cost.

Metal materials can be made into thin plate and stamped to create at least one channel for fluid passages. Any stamping process can be used to create a suitable design of fluid flow channels. In one embodiment, a thin metal sheet less than about 1 mm thick are punched using a press tool which is loaded on a machine press or stamping press. The press tool embodies a specific shape and a 3 dimensional channel design to the metal plate in the stamping process. The stamping process could be a single stage operation where every stroke of the press produce the desired form and channel design on the metal plate, or could occur through a series of stages. The channels created can be used as the fluid passage that directs the flow of reactive gases to the anode and cathode of a fuel cell. The metal plate may have additional channel(s) for fluids such as a liquid coolant for controlling the temperature of a fuel cell. A bipolar plate typically has anode gas flow channels on one side and cathode gas flow channels on the other.

Figure 1:
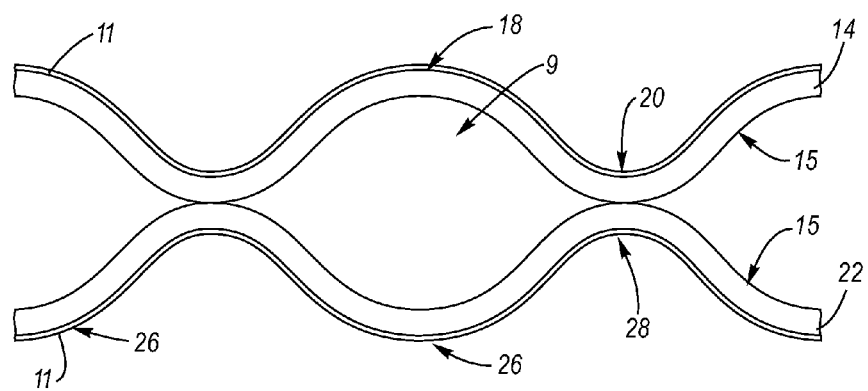
FIG. 1 illustrates a bipolar plate having a corrosion-resistant and/or conductive layer thereon according to one embodiment of the invention.
Figure 2:
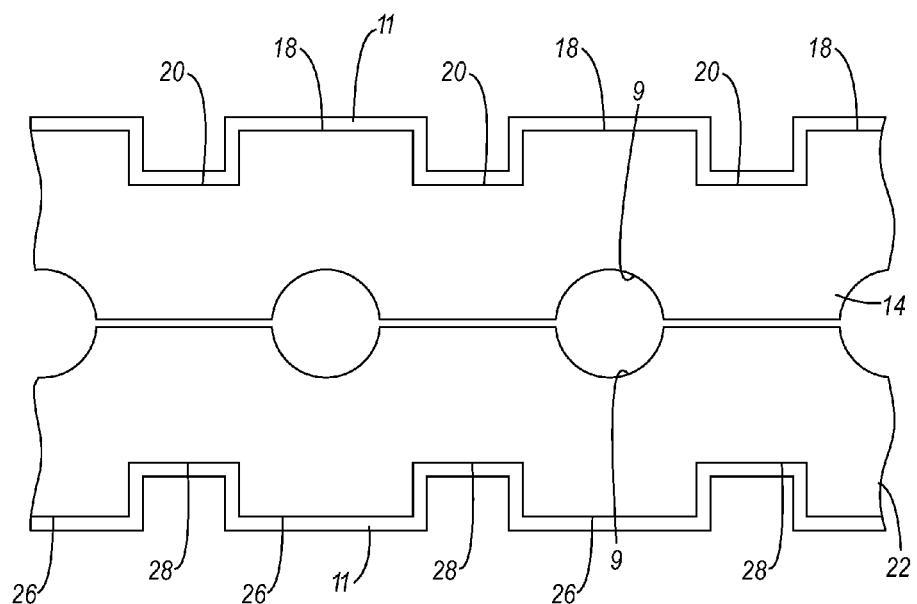
FIG. 2 illustrates a bipolar plate having a corrosion-resistant and/or conductive layer thereon according to another embodiment of the invention.

FIGS. 1-2 illustrate embodiments of bipolar plates 14 and 22 which may be utilized to make a fuel cell stack according to one embodiment of the invention. Referring now to FIG. 1, a first plate 14 may be stamped to provide a plurality of lands 18 and channels therein to facilitate the flow of reactant gases through the channels 20. Similarly, a second plate 22 may be stamped to provide a plurality of lands 26 and channels 28 therein to facilitate the flow of a different reactant gas through the channels 28. The plates 14 and 22 may be connected together by any of a variety of means known to those skilled in the art, including welding, stapling, brazing or by way of an adhesive. When connected together, the first plate 14 and second plate 22 may define coolant channels 9 therebetween. A corrosion-resistant and/or conductive layer 11 may be deposited on the entire flow field surface, including the lands 18 and channels 22 of the first plate 14 or the lands 26 and channels 28 of the second plate 22 or the coating 11 may be selectively deposited over portions of each plate. The coating 11 may be applied after the individual plates have been stamped and before or after connecting the plates together. It may also be possible to apply the coating 11 to a surface of a relatively flat plates 14, 22 prior to stamping. Referring to FIG. 2, the coating 11 may also be applied to a more traditional bipolar plate 14 or 22 which may be formed by machining channels 20 in a relatively thicker metal substrate.

According to one embodiment, a metal plate 14, 22 having at least one fluid channel may be anodized to form a corrosion resistant surface layer. A conductive layer may be subsequently deposited on the anodized surface layer using an atomic layer deposition method. Anodizing is an electrolytic process of increase the thickness and density of the innate metal oxide layer on the surface of the metal plate. In the anodizing process, the metal plate configured as an anode, along with an inert cathode material is immersed in an electrolyte to form an electrochemical cell. An electrochemical potential or a voltage is applied to the electrochemical cell to cause controlled oxidation of the metal plate anode until a desired thickness or level of passivation of the metal plate anode is achieved. Various electrolytes may be used in the process depending on the metal substrate and voltage applied. Non-limiting examples of the electrolyte may include solutions of sulfuric acid, borates, organic acids, oxalic acid, chromic acid, nitric acid and the like. For example, an aluminum metal plate can be anodized in a sulfuric acid or chromic acid solution at a voltage of about 10 to 25V to create an anodized oxide layer of about 0.5 to about 15 μm thick. After anodizing process, the metal plate exhibits good corrosion resistance. Additionally, the hydrophilic nature and pore-like structure of the anodized surface layer, especially that of an aluminum, stainless steel or titanium plate, also provides a water contact angle of 40 degree or less. Due to the formation of non-conductive oxide on the surface, however, the electric contact resistance of the anodized metal plate is typically too high for a fuel cell bipolar plate. A conductive surface layer is therefore needed to provide the necessary surface conductivity.

Anodized metal plate 14, 22 has not only a macroscopic channel structure, but also a typical rough microscopic pore-like surface texture resulted from the oxide layer formed during anodizing process. It is therefore challenging for depositing a uniform and thin layer throughout the surface to provide the necessary surface conductivity at low cost while maintaining a small water contact angle. An atomic layer deposition method as described below provides improved results over other traditional methods on such macroscopic and microscopic pore-like surface.

In one embodiment, a conductive layer 11 is deposited on the anodized metal plate 14, 22 using an atomic layer deposition method. Various corrosion resistant and conductive materials may be used to coat the bipolar plate to provide a surface contact resistance of about 10 milliohms/$cm^2$ or less. The conductive layer, for example, may include a conductive material including at least one of carbon, noble metals, metal oxides, and metal oxynitrides. Noble metals include platinum and gold, although silver, tantalum, palladium and rhodium may also be considered. Examples of metal oxides may include, but not limited to, ruthenium oxide, doped titanium oxide, titanium oxide with oxygen deficiency, doped tin oxide and any mixed oxides thereof. Examples of metal oxynitride may include, but not limited to titanium oxynitride, zirconium oxynitride, hafnium oxynitride, tantalum oxynitride. Titanium oxynitride may be represented by the chemical formula, $TiO_xN_y$, where x is a positive real number between 0.001 and 1, and y is a positive real number between 0.1 and 2.

Atomic Layer Deposition or ALD is a self-limiting, sequential surface chemistry that deposits conformal thin-layer of materials onto metal plate substrates of varying compositions. ALD involves separate steps of precursor deposition and reaction of precursor with a reactive gas to form a desired coating layer. The precursors are typically metal compounds that can be vaporized and introduced into a deposition chamber through a controlled gas pulse. By keeping the precursors separate from the reactive gas throughout the deposition process, atomic layer control of coating grown can be obtained as fine as ~0.1 angstroms per monolayer. ALD has unique advantages over other thin film deposition techniques, as ALD grown films are conformal, pin-hole free, and chemically bonded to the metal bipolar plate substrate. With the ALD according to the invention, it is possible to deposit coatings perfectly uniform in thickness inside deep trenches, porous media and around particles. The film thickness range is usually 1-5000 nm. The amount of deposited precursor molecules is determined only by the number of reactive surface sites and is independent of the precursor exposure after saturation. The growth rate may be one monolayer per cycle, however, in some cases the growth rate may be limited to 0.25-0.3 of a monolayer due to steric hindrance by the absorbed precursor molecules.

The ALD process may include at least one deposition cycle including: (i) pulsing gas vapor of a first compound (typically a metal compound) into a deposition chamber where at least one metal plate substrate is situated; the first compound being chemisorbed on or reactively attached to the metal plate surface; (ii) purging the deposition chamber to remove residue vapor of the first compound; (iii) introducing, in one or more additional pulses, optionally separated by intermediate purges, a second compound, optionally with a third compound, to the deposition chamber; and (iv) purging the deposition chamber. If the compounds are solid or liquid at room temperature, the necessary gas vapor can be generated by direct vaporization in a vaporizer, with or without a solvent, or by a bubbler.

Figure 3:
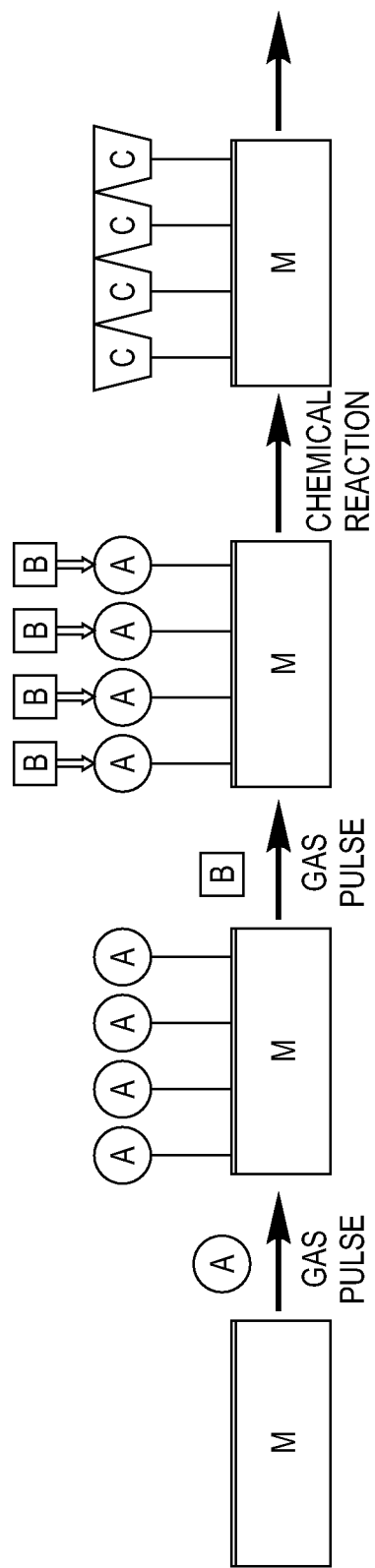
FIG. 3 is a schematic representation of an atomic layer deposition process for depositing a corrosion resistant and/or conductive layer on a bipolar plate according to one embodiment of the invention.

FIG. 3 represents an ALD process for depositing a corrosion resistant and/or conductive layer on a metal plate substrate according to one embodiment of the invention. In an ALD deposition chamber, the metal plate 14, 22 substrate M is subjected to a gas pulse comprising the vapor of a first metal compound A which can react with or chemisorbed on the surface of the metal plate substrate at a temperature sufficiently high for such reaction/adsorption to occur whereby a single atomic layer of the first compound is formed on the surface. The reaction space may be subsequently purged to remove excess vapor of the first compound and any volatile reaction products. Purging is typically accomplished by introduction of an inert purge gas into the reaction space. By subjecting the adsorbed atomic layer of the first compound to a gas pulse comprising the vapor of a second compound B, a chemical reaction between adsorbed compound A and the second compound B occurs at sufficiently high temperature, yielding a compound C on the metal substrate. This procedure can be repeated by using the gas pulses of first and second compounds until the layer of formed compound C reaches a desired thickness in a layer-by-layer manner.

When a purge gas is used to remove chemicals from the reaction space, various inert and non-inert purge gases may be used. Exemplary purge gases include nitrogen ($N_2$), helium (He), neon (Ne), argon (Ar), carbon dioxide ($CO_2$), and mixtures thereof. A constant flow of one or more of these purge gases may also be used to transport the metal compound or other reactive compounds into the reaction space and/or to adjust the pressure within the reaction space.

The apparatus for carrying out the above ALD method may comprise a vacuum chamber for providing an evacuated atmosphere with support for holding at least one metal plate substrate, mechanical storage of compounds, heating elements, and mechanical setup for generating and directing flows of gas pulses comprising compound vapors and inert gas to the deposition chamber. One such apparatus is described in U.S. Pat. No. 4,389,973 of Suntola et al.

The ALD process is usually performed at elevated temperatures and pressures. For example, the reaction space in the deposition chamber may be heated to between 100° C. and 600° C., and pumped down to a pressure of approximately 0.1 to 10 Torr, preferably at about 1 Torr. Similarly, the vapor flow and pulse time for each pulse in each process can vary widely. In one embodiment the vapor flow is from approximately 1 sccm to 2000 sccm and preferably from approximately 5 sccm to 1000 sccm. Conventional ALD has a typical gas pulse time of about 0.01 second to about 5 seconds. In one embodiment of this invention, however, a long pulse time for at least the first metal compound, ranging from 10 to 50 seconds, preferably from 20 to about 30 seconds, are be used. Such long gas pulse time provides uniform deposition on the pore-like three dimensional surface of the metal bipolar plate substrate. For example, the anodized metal plates described above has both macroscopic channels and microscopic pore-like structure. To deposit a thin conductive layer of materials on such 3 dimensional surface to provide sufficiently low electric contact resistance, a long gas pulse time of about 30 seconds, may be used. By using long pulse gas time, a very thin and yet electric conductive surface layer can be achieved. Additionally, a small water contact angle (less than 40 degree) is also maintained.

The compounds used in the ALD process are typically vaporized after loading them in their corresponding containers by heating the compound material or reducing pressure inside the container. A vacuum line may be coupled to the compound container for reducing pressure inside the compound container. The vacuum line may bypass a reaction chamber of the thin film deposition system to prevent particles from being drawn through the flow path and into the deposition chamber. The vaporized compound may be drawn into a staging volume, via a pressure differential, upon opening an optional isolation valve between the container and the staging volume.

Many metal compounds may be used in connection with the ALD processes of the present invention, but preferred metal compounds are those that have sufficient vapor pressure at low temperature and are capable of chemisorbing on or reacting with the surface of the metal plate surface. Examples of the metal compounds include titanium trichloride, titanium tetrachloride, titaniumtetraiodate, titanium alkoxide, bis(diethylamido)bis(dimethylamido)-titanium(IV), tetrakis(diethylamido)titanium(IV), tetrakis(dimethylamido)titanium(IV), tetrakis(ethylmethylamido)titanium(IV), cyclopentadienyl(trimethyl)platinum(IV), aluminum sce-butoxide, aluminum tribromide, aluminum trichloride, diethylaluminum ethoxide, tris(ethylmethylamindo)aluminum, triethylaluminum, triisobutylaluminum, trimethylaluminum, tris(diethylamido)aluminum bis(ethylcyclopentadienyl)ruthenium(II), zirconium tetrachloride, zirconium tetraiodate, hafnium tetrachloride, hafnium tetraiodate, niobium pentachloride, tantalum pentachloride, molybdenum pentachloride, tungsten hexachloride, and tungsten hexafluoride. Any of the metal compounds in groups 3 to 12 (sometimes called groups IB to VIIIB) of the periodic table of the elements may be used in connection with the processes described herein. Metal elements in the metal compounds include aluminum, noble metal elements, metal elements from group 5, including titanium (Ti), zirconium (Zr), and hafnium (Hf); metals from group 6, including vanadium (V), niobium (Nb), and tantalum (Ta), and metals from group 7, including chromium (Cr), molybdenum (Mo), and tungsten (W).

The metal compound may include a mixture of chemicals, including two or more metal compounds, or molecules having two or more metal elements. Both embodiments produce a layer that includes more than one metal element. The ability to tailor the layer composition by controlling the composition of the metal compound enables fine adjustment of the electrical, chemical, and physical properties of the resulting deposited layer. The different metal elements may be from the same or different groups of the periodic table of the elements. In one example, a mixture of a titanium compound and a ruthenium compound is included in a gas pulse or in two separate gas pulses in the ALD process. A gas pulse comprising an oxygen compound is further used to convert the adsorbed titanium compound and ruthenium compound into their corresponding oxides at a sufficiently high temperature. The temperature is typically between 200° and 600° C. A titanium oxide/ruthenium oxide mixture layer is thus formed through the ALD process. Such titanium oxide/ruthenium oxide mixture deposited by the ALD process forms a thin and extremely uniform pin-hole free layer on the metal plate for excellent corrosion resistance and low electric contact resistance.

In the embodiment where an anodized metal plate is used as the substrate for a bipolar plate, a conductive layer comprising titanium oxynitride, doped titanium oxide, doped titanium oxynitride, doped tin oxide, gold, platinum, carbon, ruthenium, ruthenium oxide and any mixture thereof may be deposited on the anodized surface To deposit a layer comprising platinum, gold, ruthenium, or carbon, cyclopentadienyl (trimethyl)platinum(IV), dimethyl Au carboxylates, oragno chloro aurates, bis(ethylcyclopentadienyl)ruthenium(II), and aromatic hydrocarbons, methane, ethylene, propylene or acetylene gas may be used as the corresponding metal compound precursors in the ALD method. To deposit a layer comprising ruthenium oxide and/or titanium oxynitride, bis (ethylcyclopentadienyl)ruthenium(II), titanium tetrachloride, titanium tetrabromide, titanium alkoxide, bis(diethylamido)bis(dimethylamido)-titanium(IV), tetrakis(diethylamido)titanium(IV), tetrakis(dimethylamido)titanium(IV), and tetrakis(ethylmethylamido)titanium(IV) may be used as the corresponding metal compound precursors. In the ALD method, a gas pulse comprising a metal compound is introduced into a deposition chamber where at least a metal plate is fixed as the substrate. A relatively long gas pulse time of at least 10 seconds is used such that a sufficient amount of a uniform layer of metal compound is chemisorbed or reactively attached to the pore-like surface structure of the anodized metal plate. A gas purge may be subsequently used to remove the residue metal compound vapor in the deposition chamber. For example, a pulse time of about 20 seconds or more may be used on an anodized aluminum plate. In the case where a metal layer (such as gold, platinum, carbon or ruthenium metal layer) is desired, a gas pulse comprising an reducing agent such as hydrogen and carbon monoxide may be used after the gas pulse of the corresponding metal compound to convert the surface adsorbed or chemically attached metal compound layer into a metal layer. In the case where a metal oxide such as ruthenium oxide and/or titanium oxide is desired, a gas pulse comprising an oxygen compound such as atomic oxygen (O) oxygen gas ($O_2$), ozone ($O_3$), water ($H_2O$), nitric oxide (NO), nitrous oxide ($N_2O$), and hydrogen peroxide ($H_2O$) may be used to convert the adsorbed metal compound into the corresponding metal oxide layer. In the case where titanium oxynitride is desired, a gas pulse comprising a oxygen and a nitrogen compounds is introduced into the deposition chamber to convert the adsorbed titanium compound (such as tetrakis(diethylamido)titanium(IV)) into a titanium oxynitride. The nitrogen compound may include ammonia, hydrazine, N,N'-dimethylhydrazine, nitrogen gas, atomic nitrogen, amines, nitric oxide, and nitrous oxide. The oxygen compound may include water, oxygen, ozone, peroxide, and atomic oxygen. The relative ratio of oxygen to nitrogen in the titanium oxynitride may be adjusted by controlling the relative amount of the oxygen and nitrogen gas compounds introduced to the deposition chamber. In one example, the reaction pressure is on the order of 1 torr and the reaction temperature is set at about 300° C. in the deposition chamber. A residual gas analyzer (RGA) may be used to monitor the gas phase composition in the deposition chamber. The oxygen compound may be $H_2O$ and $O_2$. The content of nitrogen and oxygen compounds may be controlled with purge time and monitored by the RGA.

The thickness of the conductive layer deposited on the metal plate can be easily controlled by the number of deposition cycles of the ALD process. Since the metal plate according to the this embodiment includes a corrosion resistant metal oxide layer having low water contact angle, the conductive layer is thus configured to be thick enough to provide low enough electric contact resistance, but thin enough to maintain the low water contact angle of 40 degree or less. Typically, the contact resistance of the metal plate is about 10 milliohms/$cm^2$ or less after the deposition of the conductive layer using the ALD method. For example, in various embodiments the conductive layer may have a thickness of 1 nm to 100 nm, may be made using 0.01 mg/$cm^2$ to 4 mg/$cm^2$ of conductive material, may be deposited using 10 to 10,000 ALD deposition cycle to produce contact angles after ALD deposition <40 degrees.

In one exemplary example, a thin aluminum, stainless steel or titanium metal plate is stamped to form a fuel cell channel design. The stamped metal plate is then anodized in an electrolyte solution (such as an aqueous sulfuric acid solution) to form a rough and pore-like metal oxide surface layer. Such metal oxide layer provides excellent corrosion protection and low water contact angle of 40 degree or less. A gold, platinum, carbon, ruthenium, ruthenium oxide, titanium oxide/ruthenium oxide mixture, or a titanium oxynitride layer is deposited on the anodized metal plate using the ALD method described above. A bipolar plate according to one embodiment of this invention is thus prepared. The bipolar plate has a contact resistance of about 10 milliohms/$cm^2$ and a water contact angle of less than 40 degree.

In another embodiment, a corrosion resistant layer and a separate electrically conductive layer are individually deposited on a metal plate using the ALD method. The ALD method provides a pin-hole free and uniform layer on the metal plate for high level of corrosion protection of the metal plate. In addition, the corrosion resistant layer also provides low water contact angle for improved water management and low power stability (LPS). The conductive layer is typically deposited on the corrosion resistant layer to provide low contact resistance. Such corrosion resistant and electrically conductive layers made by the ALD method thus render low cost metal plates such as aluminum, stainless steel and titanium plates, suitable for fuel cell bipolar plates. In particular, an aluminum plate is made into a fuel cell bipolar plate with sufficient corrosion resistance and electric conductivity at low cost. Due to the low gravimetric density of aluminum, a low cost and light weight bipolar plate is prepared, which significantly improves the power density of a fuel cell. Metal oxides, metal nitrides, metal carbides and mixtures thereof may be deposited on a metal plate as a corrosion resistance layer. In one example, the corrosion resistant layer comprises at least one metal oxide. The metal oxide may include, but not limited to, aluminum oxide, titanium oxide, ruthenium oxide, tantalum oxide. Titanium oxide and Ruthenium oxide may be deposited according to the ALD method described above. Aluminum oxide may be deposited by exposing a metal plate to a gas pulse comprising the gas vapor of aluminum sec-butoxide, aluminum tribromide, aluminum trichloride, diethylaluminum ethoxide, tris(ethylmethylamindo)aluminum, triethylaluminum, triisobutylaluminum, trimethylaluminum, or tris(diethylamido)aluminum in a deposition chamber. The deposition chamber is subsequently purged with an inert gas such as nitrogen and helium to remove any residue aluminum compound vapor. An gas pulse comprising an oxygen compound gas such as water, oxygen, ozone, and hydrogen peroxide are further introduced into the deposition chamber at sufficiently high temperature (100° C. to 600° C.) to convert the adsorbed aluminum compound into aluminum oxide surface layer. Such deposition cycle can be repeated until a sufficient protective alumina layer is formed.

In one particular example, a metal plate is first exposed to a trimethylaluminum gas pulse in an ALD deposition chamber. The hydroxyl groups on the metal plate surface react with the trimethylaluminum vapor to form a monolayer of a chemisorbed organoaluminum. The reaction is represented in the following chemical reaction where M-OH represents the metal hydroxyl group on the surface of the metal plate:

$$(CH_3)_3Al(gas)+M-OH \rightarrow M-O-Al(CH_3)_2+CH_4$$

The ALD deposition chamber is subsequently purged with nitrogen gas to remove any residue trimethylaluminum vapor before a gas pulse comprising water vapor is introduced. The water vapor converts the organoaluminum adsorbed on the metal plate surface into aluminum oxide with hydroxyl surface group as represented in the following chemical reaction:

$$M-O-Al(CH_3)_2+2H_2O(gas) \rightarrow M-O-Al(O)-OH+2CH_4$$

The deposition cycle can be repeated as represented by the following chemical reactions to form additional layer(s) of aluminum oxide:

$$M-O-Al(O)-OH+(CH_3)_3Al(gas) \rightarrow M-O-Al(O)-O-Al(CH_3)_2+CH_4$$

$$M-O-Al(O)-O-Al(CH_3)_2+2H_2O \rightarrow M-O-Al(O)-O-Al(O)-OH+2CH_4$$

A desired thickness of a uniform pinhole free aluminum oxide layer is formed by performing the corresponding number of ALD deposition cycles.

Figure 4:
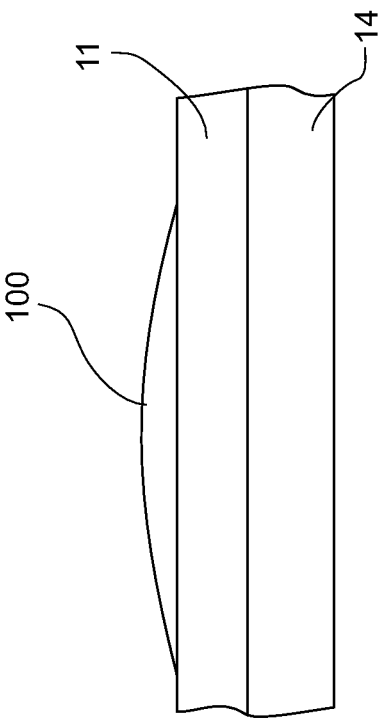
FIG. 4 is an illustration of a photomicrograph of a water droplet on an alumina surface showing a very small water contact angle.

The alumina layer prepared as described above exhibits very low water contact angle. FIG. 4 illustrates a photomicrograph of a water 100 droplet on an aluminum oxide surface 11 over a first plate 14. As can be seen, the water contact angle is only about 15 degree. Such a low water contact angle prevents formation of water droplets inside the gas flow channels, and thus significantly improves the water management of a fuel cell. An electrically conductive layer is further deposited on the corrosion resistance layer using the ALD method as described above on the corrosion resistant metal oxide layer to lower the electric contact resistance to about 10 milliohms/cm² or less. The thickness of the conductive layer is controlled such that the water contact angle of the metal plate is no more than 40 degree while the electric contact resistance is 10 milliohms/cm² or less. Examples of electrically conductive layer include noble metals such as gold and platinum, titanium oxynitride, doped titanium oxide, doped tin oxide, carbon, ruthenium, and ruthenium oxide. Desired combination of corrosion resistance, electric contact resistance and water management properties is achieved because both layers are deposited by the ALD method.

In yet another embodiment, a surface layer having corrosion resistance, low water contact angle and high electric conductivity is deposited on the metal plate using the ALD method. In one example, a titanium oxynitride is deposited using an ALD method on a metal plate. A metal plate comprising aluminum, stainless steel or titanium metal or their alloys is placed in a deposition chamber of an ALD apparatus. A gas pulse comprising a titanium compound vapor, such as tetrakis(diethylamido)titanium gas vapor, is introduced into the deposition chamber at a pressure of about 1 torr and a temperature of about 300° C. such that a molecular layer of the titanium compound is adsorbed uniformly on the metal plate surface. The deposition chamber is then purged with an inert gas such as nitrogen gas to remove any residue titanium compound vapor in the deposition chamber. A second gas pulse comprising a nitrogen compound such as ammonia ($NH_3$) and an oxygen compound such as water ($H_2O$) and oxygen gas ($O_2$) is introduced into the deposition chamber. Alternatively, a nitrogen gas pulse and an oxygen gas pulse are introduced to the deposition chamber separately. The nitrogen compound and the oxygen compound react with the adsorbed titanium compound to convert the titanium compound into a titanium oxynitride. The titanium oxynitride deposition cycle is thus repeated until the contact resistance of the metal plate reaches about 10 milliohms/cm² or less, and a uniform corrosion resistant layer is formed on the metal plate surface. $TiO_xN_y$ layer with various N/O ratios can be deposited by using various tetrakis(diethylamido)titanium, $NH_3$ and $H_2O/O_2$ contents. The N/O ratio of the as-deposited layer is also tunable by varying the contents of the $H_2O$ and $O_2$ in the deposition chamber. In particular, a layer of titanium oxynitride represented by the formula, $TiO_xN_y$, is deposited on a metal plate, where x has a numeric value between 0.001 and 1, and Y has a numeric value between 0.1 to 2. The titanium oxynitride layer not only provides low electric contact resistance and excellent corrosion resistance, but also a low water contact angle of 12-15 degrees and an electrical contact resistance of <10 milliohms, cm². Other nitrogen compounds that may be used in the ALD method includes, but not limited to, atomic nitrogen (N), hydrazine ($H_2NNH_2$), primary, secondary and tertiary alkyl amines, alkyl hydrazine (such as N,N'-dimethylhydrazine) and the like. Other oxygen compounds that may be used in the ALD method includes, but not limited to, atomic oxygen (O), ozone ($O_3$), nitric oxide (NO), nitrous oxide ($N_2O$), hydrogen peroxide ($H_2O_2$) and the like. The deposition pressure of 1 Torr was used through the entire process, the length of precursor pulse was between 10 to 25 seconds and the purging period between two pulses were 1 second long. $TiO_xN_y$ can also be deposited by PVD process like sputtering, e-beam evaporation, CVD process, PECVD using rf or microwave sources.

Figure 5:
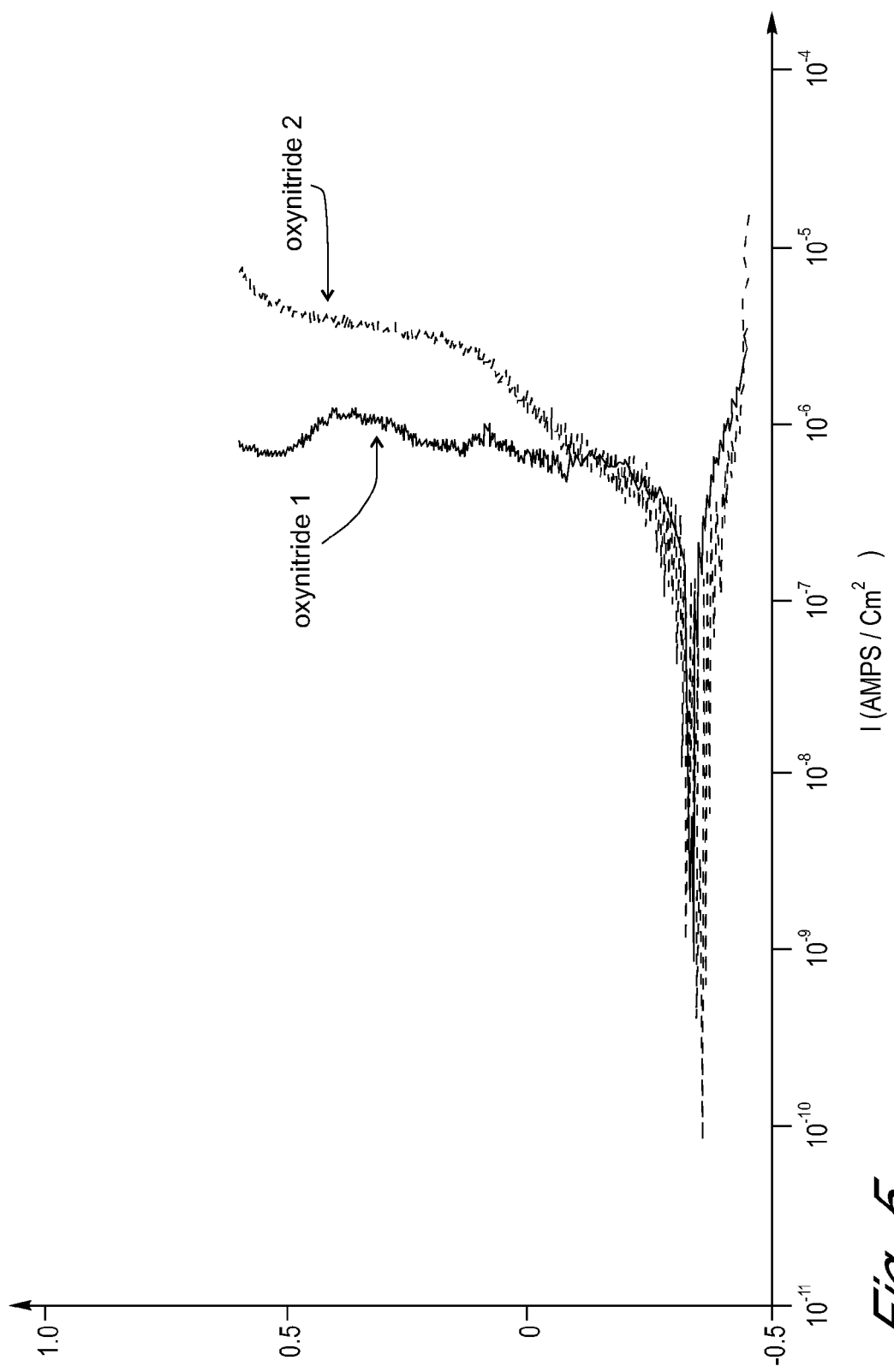
FIG. 5 is a potentiodynamic polarization curves obtained on two samples labeled oxynitride 1 and oxynitride 2, of titanium oxynitride in a solution of 0.1 ppm HF solution at pH=3 at 80° C. (scan rate of 0.1 millivolt/second)

FIG. 5 shows a potentiodynamic polarization curves obtained on two samples of titanium oxynitride in a solution of 0.1 ppm HF solution at pH=3 at 80° C. (with a scan rate of 0.1 millivolt/second). The titanium oxynitride 1 sample had an atomic composition of $Ti_{15}O_{25}N_{17}$ whereas the oxynitride 2 had an atomic composition of $Ti_{14}O_{39}N_6$. Both samples showed low contact resistance of 7 milliohms cm². The contact angle were 12 degrees for the sample 2 and 17 degrees for sample 1, on a Al metal plate. The hydrogen fluoride (HF) solution and 80° C. temperature is very similar to the harsh corrosive environment in a hydrogen fuel cell. As can be seen from the graph, very low corrosion current, $10^{-6}$ to $10^{-5}$ amps/cm², is observed at electrochemical potential ranging from −0.5V to +0.5V relative to a Ag/AgCl standard electrode. Such low current density indicates that the titanium oxynitride layer provides excellent corrosion protection of the metal plate substrate for fuel cell application.

Figure 6:
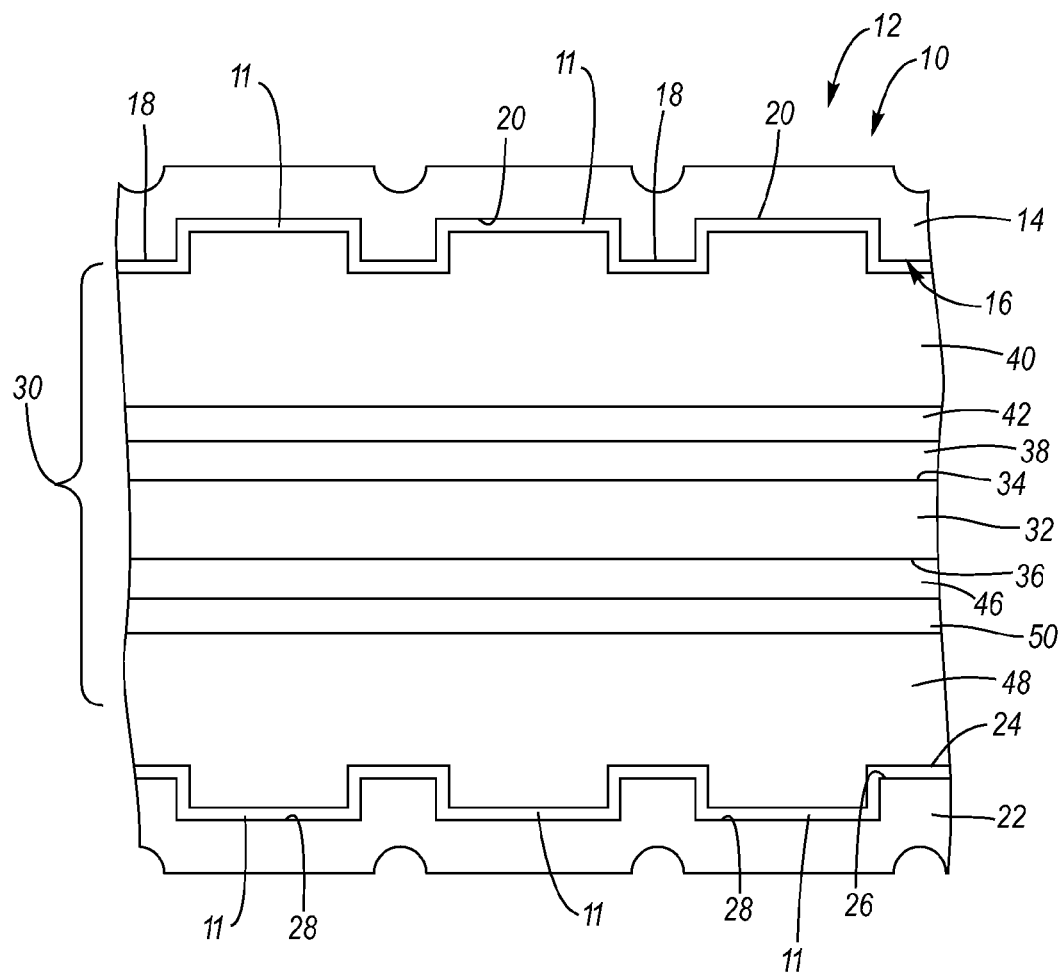
FIG. 6 illustrates a portion of a fuel cell stack including a plurality of bipolar plates according to one embodiment of the invention.

Referring now to FIG. 6, one embodiment of the invention includes a product 10 comprising a fuel cell 12. The fuel cell 12 may include a first fuel cell bipolar plate 14 including a first face 16 having a reactant gas flow field defined therein by a plurality of lands 18 and channels 20. The reactant gas flow field may deliver a fuel on one side of the bipolar plate and an oxidant on the other side of the bipolar plate. The surface of the lands 18 may include a conductive coating or bare metal surface. The conductive coating may be a thin layer of noble metal, carbon, metal carbide, metal nitride or a conductive oxide as described above. The bipolar plate may be prepared by stamping a thin sheet of valve metal such as titanium sheet to form a designed pattern of channels 20 for fluid passages.

According to one embodiment of the invention, the entire surface including the lands 18 and the channels 20 may be coated with a conductive coating 11 using ALD. The fuel cell 12 may also include a second fuel cell bipolar plate 22 including a first face 24 having a reactant gas flow field defined therein by a plurality of lands 26 and channels 28. The lands 18 or 16 and the channels 20 or 28 may be formed in the bipolar plate 14 or 22 by machining, etching, stamping, molding or the like. According to another embodiment, a coating 11 may be selectively deposited on portions of the bipolar plate 22, for example only on the surface defining the channel 28 formed in the bipolar plate 22.

A soft goods portion 30 may be provided between the first fuel cell bipolar plate 14 and the second fuel cell bipolar plate 22.

The soft goods portion 30 may include a polymer electrolyte membrane 32 comprising a first face 34 and a second face 36. A cathode electrode may overlie the first face 34 of the polymer electrolyte membrane 32. A first gas diffusion media layer 40 may overlie the cathode electrode 38, and optionally a first microporous layer 42 may be interposed between the first gas diffusion media layer 40 and the cathode electrode 38. The first gas diffusion media layer 40 may be hydrophobic. The first bipolar plate 14 may overlie the first gas diffusion media layer 40. If desired, a hydrophilic layer (not shown) may be interposed between the first fuel cell bipolar plate 14 and the first gas diffusion media layer 40.

An anode electrode 46 may underlie the second face 36 of the polymer electrolyte membrane 32. A second gas diffusion media layer 48 may underlie the anode layer 46, and optionally a second microporous layer 50 may be interposed between the second gas diffusion media layer 48 and the anode electrode 46. The second gas diffusion media layer 48 may be hydrophobic. The second fuel cell bipolar plate 22 may overlie the second gas diffusion media layer 48. If desired, a second hydrophilic layer (not shown) may be interposed between the second fuel cell bipolar plate 22 and the second gas diffusion media layer 48.

In various embodiments, the polymer electrolyte membrane 32 may comprise a variety of different types of membranes. The polymer electrolyte membrane 32 useful in various embodiments of the invention may be an ion-conductive material. Examples of suitable membranes are disclosed in U.S. Pat. Nos. 4,272,353 and 3,134,689, and in the Journal of Power Sources, Volume 28 (1990), pages 367-387. Such membranes are also known as ion exchange resin membranes. The resins include ionic groups in their polymeric structure; one ionic component for which is fixed or retained by the polymeric matrix and at least one other ionic component being a mobile replaceable ion electrostatically associated with the fixed component. The ability of the mobile ion to be replaced under appropriate conditions with other ions imparts ion exchange characteristics to these materials.

The ion exchange resins can be prepared by polymerizing a mixture of ingredients, one of which contains an ionic constituent. One broad class of cationic exchange, proton conductive resins is the so-called sulfonic acid cationic exchange resin. In the sulfonic acid membranes, the cationic exchange groups are sulfonic acid groups which are attached to the polymer backbone.

The formation of these ion exchange resins into membranes or chutes is well-known to those skilled in the art. The preferred type is perfluorinated sulfonic acid polymer electrolyte in which the entire membrane structure has ionic exchange characteristics. These membranes are commercially available, and a typical example of a commercial sulfonic perfluorocarbon proton conductive membrane is sold by E. I. DuPont D Nemours & Company under the trade designation NAFION. Other such membranes are available from Asahi Glass and Asahi Chemical Company. The use of other types of membranes, such as, but not limited to, perfluorinated cation-exchange membranes, hydrocarbon based cation-exchange membranes as well as anion-exchange membranes are also within the scope of the invention.

In one embodiment, the first gas diffusion media layer 40 or the second gas diffusion media layer 48 may include any electrically conductive porous material. In various embodiments, the gas diffusion media layer may include non-woven carbon fiber paper or woven carbon cloth which may be treated with a hydrophobic material, such as, but not limited to, polymers of polyvinylidene fluoride (PVDF), fluroethylene propylene, or polytetrafluoroethylene (PTFE). The gas diffusion media layer may have an average pore size ranging from 5-40 micrometers. The gas diffusion media layer may have a thickness ranging from about 100 to about 500 micrometers.

In one embodiment, the electrodes (cathode layer and anode layer) may be catalyst layers which may include catalyst particles such as platinum, and an ion conductive material such as a proton conducting ionomer, intermingled with the particles. The proton conductive material may be an ionomer such as a perfluorinated sulfonic acid polymer. The catalyst materials may include metals such as platinum, palladium, and mixtures of metals such as platinum and molybdenum, platinum and cobalt, platinum and ruthenium, platinum and nickel, platinum and tin, other platinum transition-metal alloys, and other fuel cell electrocatalysts known in the art. The catalyst materials may be finely divided if desired. The catalyst materials may be unsupported or supported on a variety of materials such as but not limited to finely divided carbon particles.

In one embodiment, the cathode electrode 38 and the anode electrode 46 may be catalyst layers which may include catalyst particles such as platinum, and an ion conductive material such as a proton conducting ionomer, intermingled with the particles. The proton conductive material may be an ionomer such as a perfluorinated sulfonic acid polymer. The catalyst materials may include metals such as platinum, palladium, and mixtures of metals such as platinum and molybdenum, platinum and cobalt, platinum and ruthenium, platinum and nickel, platinum and tin, other platinum transition-metal alloys, and other fuel cell electrocatalysts known in the art. The catalyst materials may be finely divided if desired. The catalyst materials may be unsupported or supported on a variety of materials such as but not limited to finely divided carbon particles.

In one embodiment, the first microporous layer 42 or the second microporous layer 50 may be made from materials such as carbon blacks and hydrophobic constituents such as polytetrafluoroethylene (PTFE) and polyvinylidene fluoride (PVDF), and may have a thickness ranging from about 2 to about 100 micrometers. In one embodiment the microporous layer may include a plurality of particles, for example including graphitized carbon, and a binder. In one embodiment the binder may include a hydrophobic polymer such as, but not limited to, polyvinylidene fluoride (PVDF), fluoroethylene propylene (FEP), polytetrafluoroethylene (PTFE), or other organic or inorganic hydrophobic materials. The particles and binder may be included in a liquid phase which may be, for example, a mixture of an organic solvent and water to provide dispersion. In various embodiments, the solvent may include at least one of 2-propanol, 1-propanol or ethanol, etc. The dispersion may be applied to a fuel cell substrate, such as, a gas diffusion media layer or a hydrophobic coating over the gas diffusion media layer. In another embodiment, the dispersion may be applied to an electrode. The dispersion may be dried (by evaporating the solvent) and the resulting dried microporous layer may include 60-90 weight percent particles and 10-40 weight percent binder. In various other embodiments, the binder may range from 10-30 weight percent of the dried microporous layer.

The above description of embodiments of the invention is merely exemplary in nature and, thus, variations thereof are not to be regarded as a departure from the spirit and scope of the invention.

What is claimed is:

1. A process comprising:
providing a conductive metal plate having at least one fuel cell reactant gas channel formed therein configured for fluid passage;
anodizing said conductive metal plate to form a corrosion resistant surface layer having a water contact angle less than 40 degree; the anodizing comprising immersing the metal plate in an electrolyte and forming an electrochemical cell and
depositing at least one conductive layer above said corrosion resistant surface layer using an atomic layer deposition method; said conductive layer comprising at least one of metal oxides or metal oxynitrides.

2. A process as set forth in claim 1, wherein said conductive metal plate comprises at least one of aluminum, steel, stainless steel, titanium or any alloys thereof.

3. A process as set forth in claim 2, wherein said conductive metal plate is an aluminum metal or an aluminum metal alloy.

4. A process as set forth in claim 1, wherein said conductive layer comprises at least one of titanium oxynitride or ruthenium oxide.

5. A process as set forth in claim 1, wherein said atomic layer deposition method comprises a long gas pulse time of at least 10 seconds.

6. A process as set forth in claim 5, wherein said gas pulse time is between 10 and about 30 seconds.

7. A process as set forth in claim 1 wherein the anodizing said conductive metal plate comprising exposing the metal plate to an electrolyte solution to provide a rough and pore-like metal oxide surface layer.

8. A process as set forth in claim 1 wherein the conductive layer provides a surface contact resistance of about 10 milliohms/cm$^2$ or less.

9. A process comprising:
providing a conductive metal plate wherein the metal plate comprises a fuel cell bipolar plate having a plurality of lands and channels in a face thereof to define a reactant gas flow field;
depositing on said metal plate a uniform and pinhole free corrosion resistance layer comprising at least one metal oxide using an atomic layer deposition method wherein a layer of metal is deposited first and thereafter causing the deposited metal to react with a reactive gas to form said at least one metal oxide; and
depositing at least one conductive layer above said corrosion resistant layer using an atomic layer deposition method; said conductive layer comprising at least one of metal oxides or metal oxynitrides.

10. A process as set forth in claim 9, wherein said metal plate comprises aluminum, stainless steel or titanium.

11. A process as set forth in claim 9, wherein said corrosion resistance layer comprises aluminum oxide or titanium oxide.

12. A process as set forth in claim 9, wherein said conductive layer comprises titanium oxynitride or ruthenium oxide.

13. A process as set forth in claim 9, wherein the corrosion resistance layer further comprises a metal carbide.

14. A process comprising:
providing a conductive metal plate wherein the metal plate comprises a fuel cell bipolar plate having a plurality of lands and channels in a face thereof to define a reactant gas flow field;
providing a material comprising a metal compound;
placing said conductive metal plate inside an atomic layer deposition chamber;
exposing said metal plate to a gas pulse comprising said material such that at least one atomic layer of said metal compound is adsorbed on the surface of said metal plate;
purging said deposition chamber with an inert gas to remove said material and;
after said metal compound being adsorbed on said metal plate, exposing said metal plate to a gas pulse comprising an oxygen compound and a nitrogen compound at a temperature between 100° and 600° C., causing said adsorbed metal compound to react with said oxygen compound and nitrogen compound to form a metal oxynitride.

15. A process as set forth in claim 14, wherein said conductive metal plate comprises aluminum, steel, stainless steel or titanium.

16. A process as set forth in claim 14, wherein said metal compound comprises at least one of titanium tetrachloride, titanium tetrabromide, titanium alkoxide, bis(diethylamido) bis(dimethylamido)-titanium(IV), tetrakis(diethylamido)titanium(IV), etrakis(dimethylamido)titanium(IV), tetrakis (ethylmethylamido)titanium(IV), or bis(ethylcyclopentadienyl)ruthenium(II).

17. A process as set forth in claim 14, wherein said oxygen compound comprises atomic oxygen, water, ozone, peroxide, or oxygen gas; and said nitrogen compound comprises ammonia, hydrazine, alkyl hydrazine, nitrogen monoxide, nitrogen dioxide, amine, or nitrogen containing organic ligand.

18. A process as set forth in claim 14, wherein said metal oxynitride is titanium oxynitride, zirconium oxynitride, hafnium oxynitrides or tantalum oxynitride.

19. A process as set forth in claim 18, wherein said titanium oxynitride is represented by the formula $TiO_xN_y$.

20. A process as set forth in claim 14 further comprising anodizing the conductive metal plate prior to exposing the metal plate to a gas pulse comprising the metal compound.

21. A process as set forth in claim 14, wherein the metal compound comprises at least one of vanadium, niobium, chromium, or molybdenum.

22. A process comprising:
providing a conductive metal plate having at least one fuel cell reactant gas channel formed therein configured for fluid passage;
anodizing said conductive metal plate to form a corrosion resistant surface layer having a water contact angle less than 40 degree; the anodizing comprising immersing the metal plate in an electrolyte and forming an electrochemical cell and
depositing at least one conductive layer above said corrosion resistant surface layer using an atomic layer deposition method; said conductive layer comprising at least one of titanium oxynitride or ruthenium oxide.

23. A process comprising:
providing a conductive metal plate wherein the metal plate comprises a fuel cell bipolar plate having a plurality of lands and channels in a face thereof to define a reactant gas flow field;
depositing on said metal plate a uniform and pinhole free corrosion resistance layer comprising at least one metal oxide using an atomic layer deposition method wherein a layer of metal is deposited first and thereafter causing the deposited metal to react with a reactive gas to form said at least one metal oxide; and
depositing at least one conductive layer above said corrosion resistant layer using an atomic layer deposition method; said conductive layer comprising at least one of titanium oxynitride or ruthenium oxide.

* * * * *